US012315421B2

(12) United States Patent
Qiu et al.

(10) Patent No.: US 12,315,421 B2
(45) Date of Patent: May 27, 2025

(54) ARRAY SUBSTRATE, DISPLAY PANEL AND DISPLAY DEVICE

(71) Applicants: Fuzhou BOE Optoelectronics Technology Co., Ltd., Fujian (CN); BOE Technology Group Co., Ltd., Beijing (CN)

(72) Inventors: Xinmao Qiu, Beijing (CN); Tingting Tu, Beijing (CN); Shanshan Xu, Beijing (CN); Yao Liu, Beijing (CN); Zuwen Liu, Beijing (CN); Zongxiang Li, Beijing (CN); Hao Cheng, Beijing (CN); Yawen Huang, Beijing (CN); Jiantao Lin, Beijing (CN); Jingguang Zhu, Beijing (CN); Jin Wang, Beijing (CN); Changhong Shi, Beijing (CN); Yaochao Lv, Beijing (CN); Wenchang Tao, Beijing (CN)

(73) Assignees: Fuzhou BOE Optoelectronics Technology Co., Ltd., Fujian (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/271,080

(22) PCT Filed: Aug. 19, 2022

(86) PCT No.: PCT/CN2022/113717

§ 371 (c)(1),
(2) Date: Jul. 6, 2023

(87) PCT Pub. No.: WO2024/036626

PCT Pub. Date: Feb. 22, 2024

(65) Prior Publication Data

US 2024/0386835 A1 Nov. 21, 2024

(51) Int. Cl.
*G09G 3/20* (2006.01)

(52) U.S. Cl.
CPC ... *G09G 3/2092* (2013.01); *G09G 2310/0286* (2013.01); *G09G 2310/08* (2013.01); *G09G 2330/02* (2013.01)

(58) Field of Classification Search
CPC ......... G09G 3/2092; G09G 2310/0286; G09G 2310/08; G09G 2310/0289; G09G 2310/0281
See application file for complete search history.

(56) References Cited

U.S. PATENT DOCUMENTS

| | | | | |
|---|---|---|---|---|
| 2007/0195215 | A1 | 8/2007 | Murade | |
| 2021/0066439 | A1 * | 3/2021 | Kim | H10K 50/84 |

(Continued)

FOREIGN PATENT DOCUMENTS

| | | | |
|---|---|---|---|
| CN | 110751929 | A | 2/2020 |
| CN | 110930927 | A | 3/2020 |

(Continued)

*Primary Examiner* — Dennis P Joseph
(74) *Attorney, Agent, or Firm* — WHDA, LLP

(57) ABSTRACT

The present disclosure provides an array substrate, a display panel and a display device, relating to the field of display technologies. The array substrate includes a display area and a peripheral area located at a side of the display area; the peripheral area includes a plurality of first signal line groups, and each of the first signal line groups includes two clock signal lines extending in a same direction; signals transmitted in the clock signal lines are square wave signals, a phase of a clock signal transmitted by one of the clock signal lines in each of the first signal line groups is opposite to a phase of a clock signal transmitted by the other clock signal line in the same first signal line group, and the two clock signal lines in the same first signal line group are arranged to be adjacent to each other.

12 Claims, 8 Drawing Sheets

(56) References Cited

U.S. PATENT DOCUMENTS

| | | | |
|---|---|---|---|
| 2022/0114934 A1 | 4/2022 | He et al. | |
| 2022/0284842 A1 | 9/2022 | Chen et al. | |
| 2022/0406260 A1 | 12/2022 | Pang et al. | |
| 2023/0306922 A1 * | 9/2023 | Mizuhashi | G06F 3/03545 |

FOREIGN PATENT DOCUMENTS

| | | | |
|---|---|---|---|
| CN | 111429856 | A | 7/2020 |
| CN | 113594186 | A | 11/2021 |
| CN | 113853642 | A | 12/2021 |
| CN | 215494431 | U | 1/2022 |

* cited by examiner

ARRAY SUBSTRATE, DISPLAY PANEL AND DISPLAY DEVICE

CROSS-REFERENCE TO RELATED APPLICATION

This application is a national phase application under 35 U.S.C. § 371 of International Patent Application No. PCT/CN2022/113717 filed on Aug. 19, 2022, entitled "ARRAY SUBSTRATE, DISPLAY PANEL AND DISPLAY DEVICE", the disclosure of which is incorporated by reference in its entirety herein.

TECHNICAL FIELD

The present disclosure relates to the field of display technology. in particular to an array substrate, a display panel and a display device.

BACKGROUND

A signal line transmitting a constant voltage, such as a common electrode line, exists in the display screen. The voltage transmitted by the common electrode line is referred to as a common voltage (Vcom), and the fluctuation of the common voltage may lead to poor display problems, such as horizontal stripes on the display screen, uneven display brightness (Mura), image sticking, flicker and image sticking. Taking a Liquid Crystal Display (LCD) as an example, the light emission thereof is a form of maintenance, and the liquid crystal maintains certain transmission brightness under the action of a continuous electric field, and the electric field intensity is proportional to a voltage difference between the pixel electrode and the common electrode. As a result, the display effect is seriously reduced due to the fluctuation of the Vcom signal.

SUMMARY

Embodiments of the present disclosure adopt technical solutions described below.

In a first aspect, an embodiment of the present disclosure provides an array substrate, including a display area and a peripheral area located at a side of the display area; the peripheral area includes a plurality of first signal line groups, and each of the first signal line groups comprises two clock signal lines extending in a same direction; signals transmitted in the clock signal lines are square wave signals, a phase of a clock signal transmitted by one of the clock signal lines in each of the first signal line groups is opposite to a phase of a clock signal transmitted by the other clock signal line in the same first signal line group, and the two clock signal lines in the same first signal line group are arranged to be adjacent to each other.

In some embodiments of the present disclosure, the peripheral area further includes at least one second signal line extending in the same direction as the clock signal line, and a signal transmitted in the second signal line is a constant voltage signal; a minimum distance between the second signal line and the clock signal line is less than or equal to a preset value ranging from 1 μm to 5 cm.

In some embodiments of the present disclosure, the second signal line includes at least one of a common signal line, a first power signal line, a second power signal line, a first level signal line. a second level signal line, and a ground line.

In some embodiments of the present disclosure, the common signal line includes a common electrode signal line, a common electrode feedback signal line. and a common electrode compensation signal line, and the common electrode signal line, the common electrode feedback signal line and the common electrode compensation signal line are electrically connected together.

In some embodiments of the present disclosure, the second signal line is located on a side of each of the first signal line groups facing away from the display area; and/or the second signal line is located at a side of each of the first signal line groups closing to the display area.

In some embodiments of the present disclosure, the peripheral area includes a plurality of shift register unit groups, and a number of shift register units comprised in each of the shift register unit groups is the same; the number of the shift register units in the same shift register unit group is the same as the number of the clock signal lines; each of the shift register units is located at a side of the first signal line groups closing to the display area; when each of the shift register unit groups includes N shift register units arranged in cascade, one clock signal line in one of the first signal line groups is electrically connected to a n-th stage shift register unit, and the other clock signal line in the same first signal line group is electrically connected to a (n+N/2)-th stage shift register unit, wherein n is less than or equal to N/2, n is odd and N is even.

In some embodiments of the present disclosure, the peripheral area comprises M first signal line groups, wherein the first signal line group includes an m-th clock signal line and a (m+M)-th clock signal line, wherein M comprises at least one of 3, 4, 5, 6, 8 or 10, m is less than or equal to M, and m is a positive integer; the first signal line groups are respectively arranged in sequence along a first direction, wherein the first direction is a direction pointing to the display area from the peripheral area, or the first direction is a direction pointing to the peripheral area from the display area.

In some embodiments of the present disclosure, the peripheral area includes 3 first signal line groups, a first group among the first signal line groups comprises a first clock signal line and a fourth clock signal line, a second group among the first signal line groups includes a second clock signal line and a fifth clock signal line, and a third group among the first signal line groups comprises a third clock signal line and a sixth clock signal line; the first group, the second group, and the third group among the first signal line groups are sequentially arranged in the first direction.

In some embodiments of the present disclosure, the first clock signal line, the fourth clock signal line, the second clock signal line, the fifth clock signal line, the third clock signal line, and the sixth clock signal line are sequentially arranged in the first direction.

In some embodiments of the present disclosure, the array substrate includes a substrate as well as a first conductive layer and a second conductive layer disposed on the substrate, wherein the second conductive layer is disposed on a side of the first conductive layer facing away from the substrate; the first conductive layer includes the first signal line groups, and the second conductive layer includes a plurality of clock signal auxiliary lines; an extension direction of at least a part of line segments of each of the clock signal auxiliary lines intersects with the first signal line groups; and each of the clock signal lines includes a plurality of first openings and a plurality of second openings, a number of the first openings is greater than a number of the second openings; orthographic projections of at least some of the clock signal auxiliary lines on the substrate overlap with a region delineated by orthographic projections of outer contours of the second openings on the substrate.

In some embodiments of the present disclosure, the peripheral area includes a first gap located between the shift register unit groups and the first signal line groups, and an extension direction of the first gap is the same as that of the clock signal lines; some of the clock signal auxiliary lines each comprises a meander structure, and an orthographic projection pattern on the substrate of the meander structure of each of the clock signal auxiliary lines is different in size, and the meander structure is located in the first gap.

In some embodiments of the present disclosure, some of the clock signal auxiliary lines each includes a first line segment, the meander structure and a second line segment, and the first line segment is connected to the second line segment through the meander structure; the orthographic projection of the first line segment on the substrate overlaps with the orthographic projection of the clock signal line on the substrate, for each of the clock signal auxiliary lines, a sum of a length of the first line segment along the extension direction of the first line segment, a length of the second line segment along the extension direction of the second line segment, and a length of the meander structure along the extension direction of the meander structure is the same.

In some embodiments of the present disclosure, some of the second signal lines are disposed between the first signal line groups and the shift register unit groups, and the first gap is located between the first signal line groups and the second signal lines; a size of the first gap in a direction pointing to the second signal lines from the first signal line groups is twice over the minimum distance between two adjacent clock signal lines.

In a second aspect, an embodiment of the present disclosure provides a display panel including the array substrate according to the first aspect.

In a third aspect, an embodiment of the present disclosure provides a display device, including the display panel according to the second aspect, and the display device further includes a timing controller configured to input different clock signals to respective clock signal lines of the display panel.

The above-mentioned description is merely an overview of the technical solutions of the present disclosure. In order to know about the technical means of the present disclosure more clearly and implement the solutions according to the contents of the specification, and in order to make the above-mentioned and other objectives, features and advantages of the present disclosure more apparent and understandable, specific implementations of the present disclosure are set forth below.

BRIEF DESCRIPTION OF THE DRAWINGS

In order to describe the embodiments of the present disclosure or the technical solutions in the related art more clearly, the accompanying drawings which are used in the description of the embodiments or the related art will be briefly introduced. Apparently, the accompanying drawings in the following description are some embodiments of the present disclosure, and those skilled in the art may obtain other accompanying drawings according to these accompanying drawings without paying any creative effort.

DETAILED DESCRIPTION OF THE EMBODIMENTS

Figure 1:
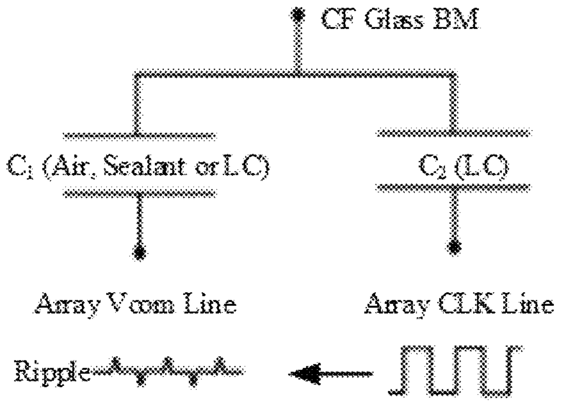
FIG. 1 is a diagram illustrating a principle of a clock signal coupling effect in the related art.

A clear and complete description for the technical solutions in the embodiments of the present disclosure will be given below in conjunction with the accompanying drawings in the embodiments of the present disclosure. Apparently, the described embodiments are merely a part of embodiments of the present disclosure, not all the embodiments. Based on the embodiments in the present disclosure, all other embodiments obtained by those skilled in the art without paying creative effort fall within the protection scope of the present disclosure.

In the drawings, the thickness of regions and layers may be exaggerated for clarity. The same reference numerals in the drawings denote the same or similar structures, and thus a detailed description thereof will be omitted. In addition, the drawings are merely schematic illustrations of the present disclosure and are not necessarily drawn to scale.

According to the embodiments of the present disclosure, “a plurality of” means two or more unless otherwise specified; the orientation or positional relationship indicated by the terms “on” or the like is based on the orientation or positional relationship shown in the drawings and is merely for convenience in describing and simplifying the present disclosure, rather than indicating or implying that a structure or element referred to must have a particular orientation, be constructed and operated in a particular orientation, and is not to be construed as a limitation on the present disclosure.

Unless the context requires otherwise, throughout the description and the claims, the term “include” is to be construed in an open, inclusive sense, that is as “including, but not limited to”. In the description of the specification, the terms “an embodiment”, “some embodiments”, “exemplary embodiments”, “examples”, “particular examples”, or “some examples”, etc. are intended to indicate that a particular feature, structure, material, or characteristic described in connection with the embodiment or example is included in at least one embodiment or example of the present disclosure. The schematic representations of the above terms do not necessarily refer to the same embodiment or example. Further, the particular features, structures, materials, or characteristics described may be included in any one or more embodiments or examples in any suitable manner.

According to an embodiment of the present disclosure, the words “first”, “second” and the like are used to distinguish the same or similar items having substantially the same functions and effects, merely to clearly describe the technical solutions of the embodiments of the present disclosure, and thus should not be interpreted as indicating or implying relative importance or implicitly indicating the number of technical features indicated.

In the related art, a transition at a rising edge or a falling edge of a clock signal of a display panel may generate a coupling effect on a signal with a constant voltage, for example, the transition at the rising edge or falling edge transition of the clock signal generates a coupling effect on a signal (Vcom signal) in a common electrode line, or the transition at the rising edge or the falling edge of the clock signal generates a coupling effect on a signal (Vcom signal) in a common electrode feedback line, thereby resulting in interference to the Vcom signal. As a result, a voltage ripple occurs on a signal with an original constant voltage, so that the display of the display panel is abnormal and the display effect is reduced.

Taking a Liquid Crystal Display (LCD) panel as an example of a display panel, the influence of the transition at the rising edge or the falling edge of a clock signal on a signal with a constant voltage is described. The LCD panel includes a color filter and an array substrate, wherein a black matrix (BM) layer is arranged on the color filter, a common electrode line (Vcom Line) and a clock signal line (CLK Line) are arranged on the array substrate (Array). Since the BM layer in the LCD display panel has a certain degree of conductive capability, as shown in FIG. 1, the BM layer and the Vcom Line for a first equivalent capacitor C1, a dielectric layer of which may be at least one of Air, Seal or Liquid Crystal (LC); the BM layer and the clock signal line (CLK Line) form a second equivalent capacitor C2, the dielectric layer of which may be a liquid crystal (LC). The BM layer on the color filter is of an integrated structure, that is, upper electrodes of the first equivalent capacitor C1 and the second equivalent capacitor C2 are electrically connected to each other. In this way, when a square wave signal as shown in FIG. 1 is generated in the clock signal line, since the upper electrodes of the first equivalent capacitor C1 and the second equivalent capacitor C2 are electrically connected together, the square wave signal in the clock signal line will be coupled to the first equivalent capacitor C1, thereby affecting the signal on the common electrode line. As a result, a voltage ripple as shown in FIG. 1 occurs on the signal (Vcom) on the common electrode line.

Figure 2:
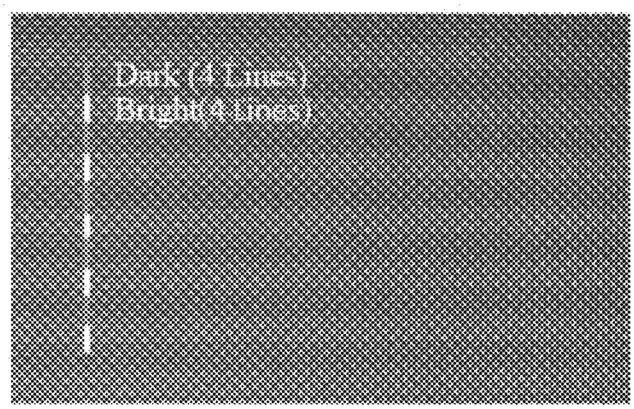
FIG. 2 is a schematic diagram illustrating a phenomenon of horizontal stripes according to an embodiment of the present disclosure.

In the liquid crystal display panel, the display brightness of each pixel unit is controlled and adjusted by controlling the voltage difference between the voltage of the common electrode and the pixel voltage. In the case where a voltage ripple as shown in FIG. 1 occurred on the signal (Vcom) on the common electrode line, the voltage difference between the voltage of the common electrode and the pixel voltage changes accordingly, resulting in uneven brightness, for example, resulting in a phenomenon of alternating light stripes and dark stripes as shown in FIG. 2. In FIG. 2, a period of the stripes is 8 rows of pixel cells, among them, four rows of pixel cells are dark and four rows of pixel cells are bright.

In view of the above, embodiments of the present disclosure propose a technical solution, in which clock signals with the rising edge transition and the falling edge transition occurred at the same timing and in opposite directions (i.e. clock signals with the same frequency and opposite phase) are loaded on adjacent clock signal lines, so that the influence of the clock signals on the signal with a constant voltage is effectively reduced through a mechanism that the coupling effects of the clock signals in two adjacent clock signal lines counteract each other. Therefore, the poor display problem caused by the interference of signal ripples in the clock signal lines on other signals is improved, and the display effect is improved.

An embodiment of the present disclosure provides an array substrate, including: a display area AA and a peripheral area BB located at one side of the display area AA.

The peripheral area BB includes multiple first signal line groups (for example, G1, G2, G3 and G4 shown in FIG. 8), and each of the first signal line groups includes two clock signal lines (CLK lines) extending in the same direction.

Figure 5:
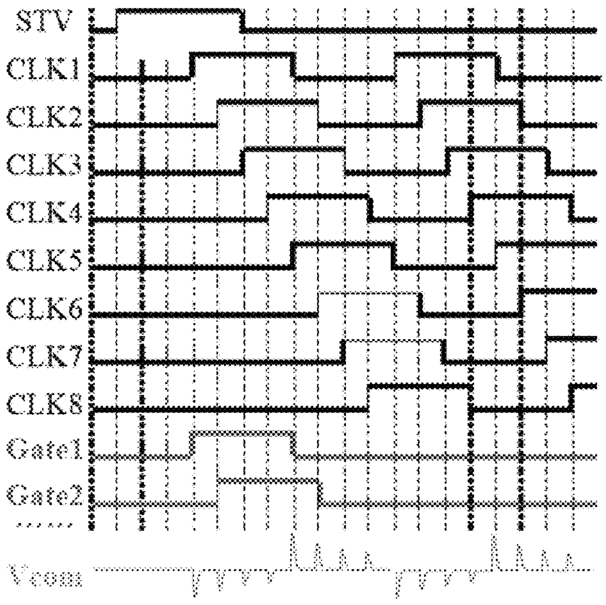
FIG. 5 is a timing diagram of the array substrate shown in FIG. 4.

The signals transmitted in the clock signal lines (CLK lines) are square wave signals as shown in FIG. 5, the phase of a clock signal transmitted by one clock signal line in the one of the first signal line group is opposite to the phase of a clock signal transmitted by another clock signal line in the same first signal line group, and two clock signal lines in the same first signal line group are arranged to be adjacent to each other.

Figure 8:
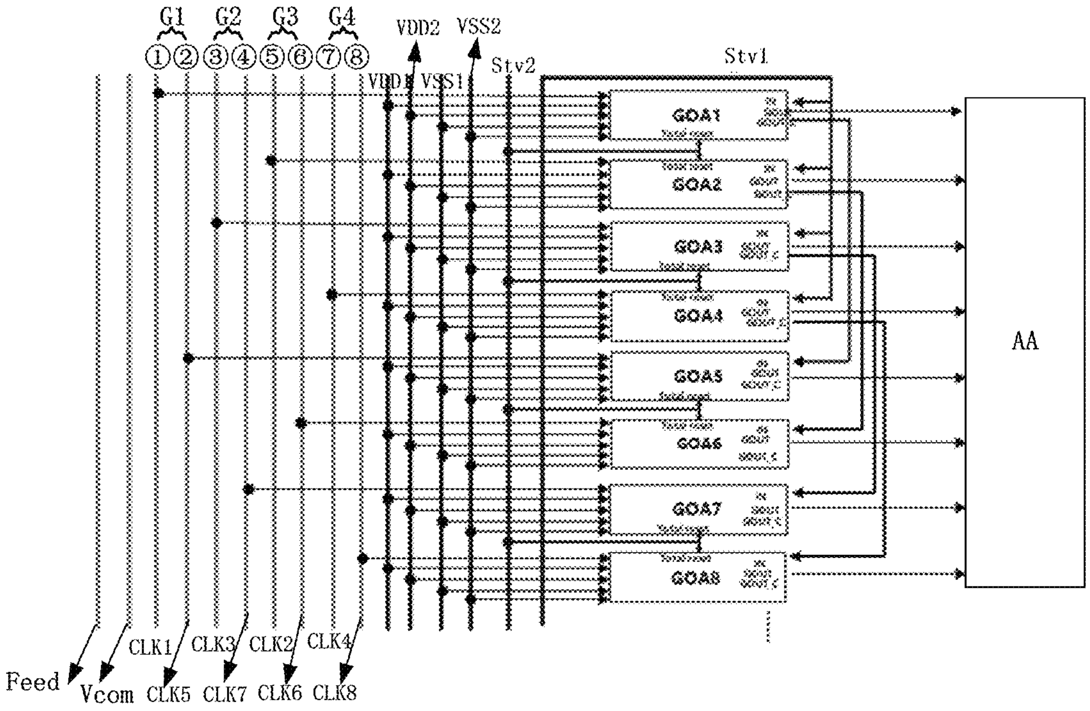
FIG. 8 is a schematic structural diagram illustrating an array substrate according to an embodiment of the present disclosure.

In an exemplary embodiment, as shown in conjunction with FIGS. 5 and 8, the peripheral area BB includes 4 first signal line groups, for example, a first group G1, a third group G3 and a fourth group G4 among the first signal line groups. For example, the first group G1 among the first signal line groups includes two clock signal lines, the clock signal transmitted in one of the clock signal lines is a first clock signal CLK1 as shown in FIG. 5, and the signal transmitted in the other clock signal line is a fifth clock signal CLK5 as shown in FIG. 5. As can be seen from FIG. 5, a falling edge of the square wave of the first clock signal CLK1 is aligned with a rising edge of the square wave of the fifth clock signal CLK5, indicating that both are transmitted at the same time.

It should be noted that, in this specification, a phrase that a rising edge of a square wave of a clock signal is located at the same time as a falling edge of a square wave of another clock signal indicates that the frequencies of the two clock signals are the same and the phases thereof are opposite, which will not be described hereinafter in detail.

The number of the first signal line groups included in the peripheral area BB is not limited herein.

In some embodiments, the peripheral area BB includes 2 first signal line groups, and the array substrate includes a circuit driven by 4 clock signals CLK; in some other embodiments, the peripheral area BB includes 3 first signal line groups, and the array substrate includes a circuit driven by 6 clock signals CLK; in still other embodiments, the peripheral area BB includes 4 first signal line groups, and the array substrate includes a circuit driven by 8 clock signals CLK; in yet other embodiments, the peripheral area BB includes 5 first signal line groups, and the array substrate includes a circuit driven by 10 clock signals CLK; of course, the number of the first signal line groups included in the peripheral area BB may also be six, eight and ten, which may be determined according to the circuit design of the actual peripheral area.

The arrangement order of two adjacent first signal line groups is not limited here, and in the case where two clock signal lines in the same first signal line group are arranged to be adjacent to each other, the arrangement order of two adjacent first signal line groups can be determined according to the design space and the circuit arrangement requirements of the peripheral area.

Figure 3:
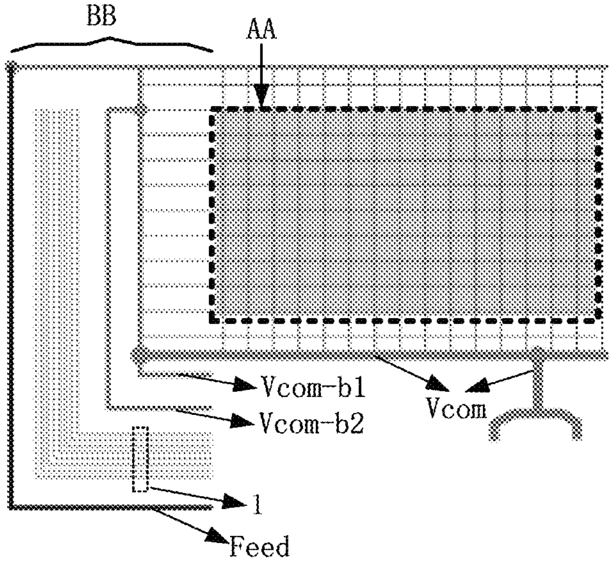
FIG. 3 is a schematic structural diagram of an array substrate according to an embodiment of the present disclosure.

A structure of an array substrate is shown In FIG. 3, where the peripheral area BB is located at one side of the display area AA. The peripheral area BB includes multiple first signal line groups 1. A common electrode signal line (Vcom line) extends from the display area AA to the peripheral area BB. The peripheral area BB is further provided with a common electrode feedback signal line (Feed line) and a common electrode compensation signal line (such as Vom-b1 and Vom-b2). In some embodiments, as shown in FIG. 3, the common electrode signal line (Vcom line) and the common electrode feedback signal line (Feed line) can be respectively arranged on two sides of the multiple first signal line groups 1; in other embodiments, the common electrode signal line (Vcom line) and the common electrode feedback signal line (Feed line) may both be located on a side of the first signal line groups 1 facing away from the display area AA.

Figure 4:
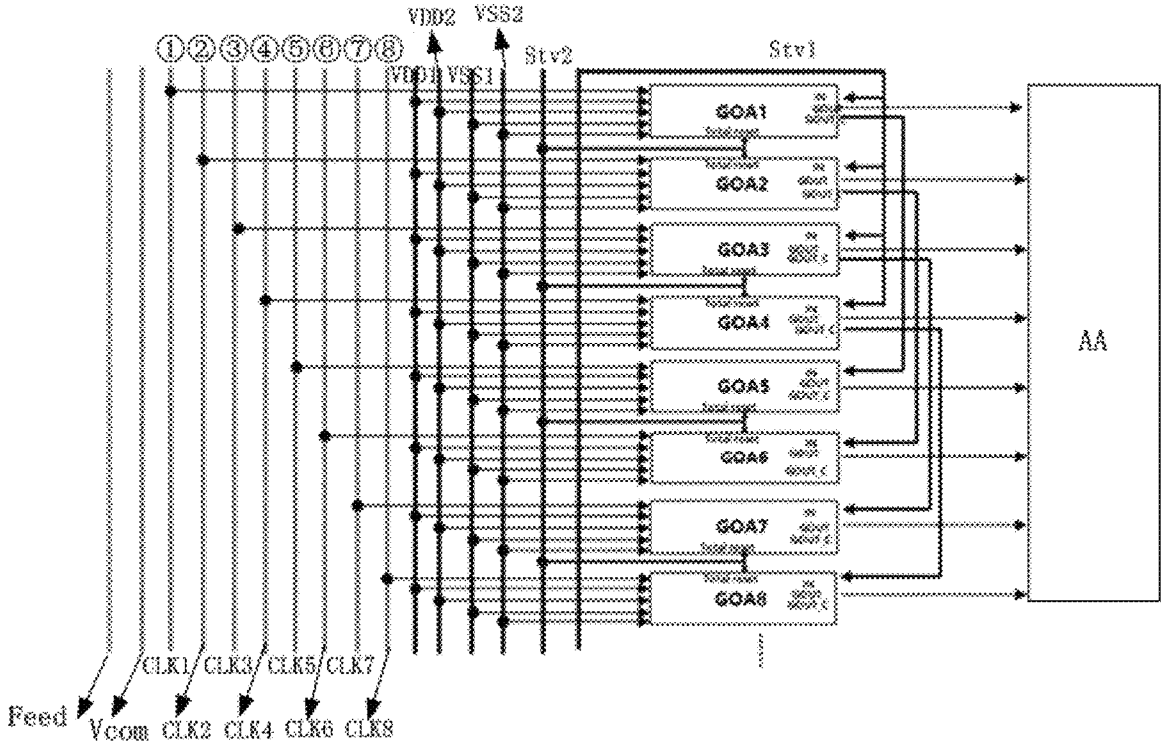
FIG. 4 is a schematic structural diagram of an array substrate driven by 8 clock signals in the related art.
Figure 11:
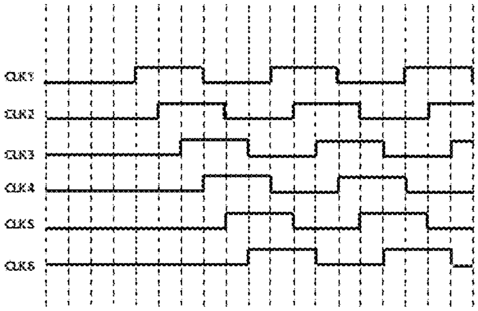
FIG. 11 is a timing diagram of array substrates shown in FIGS. 12 and 13.
Figure 12:
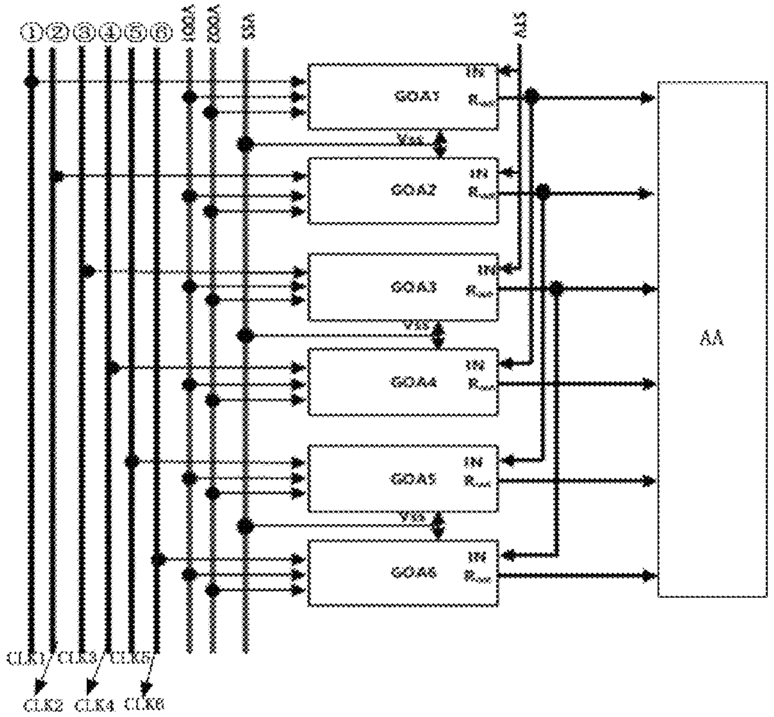
FIG. 12 is a schematic structural diagram illustrating an array substrate driven by 6 clock signals in the related art.
Figure 14:
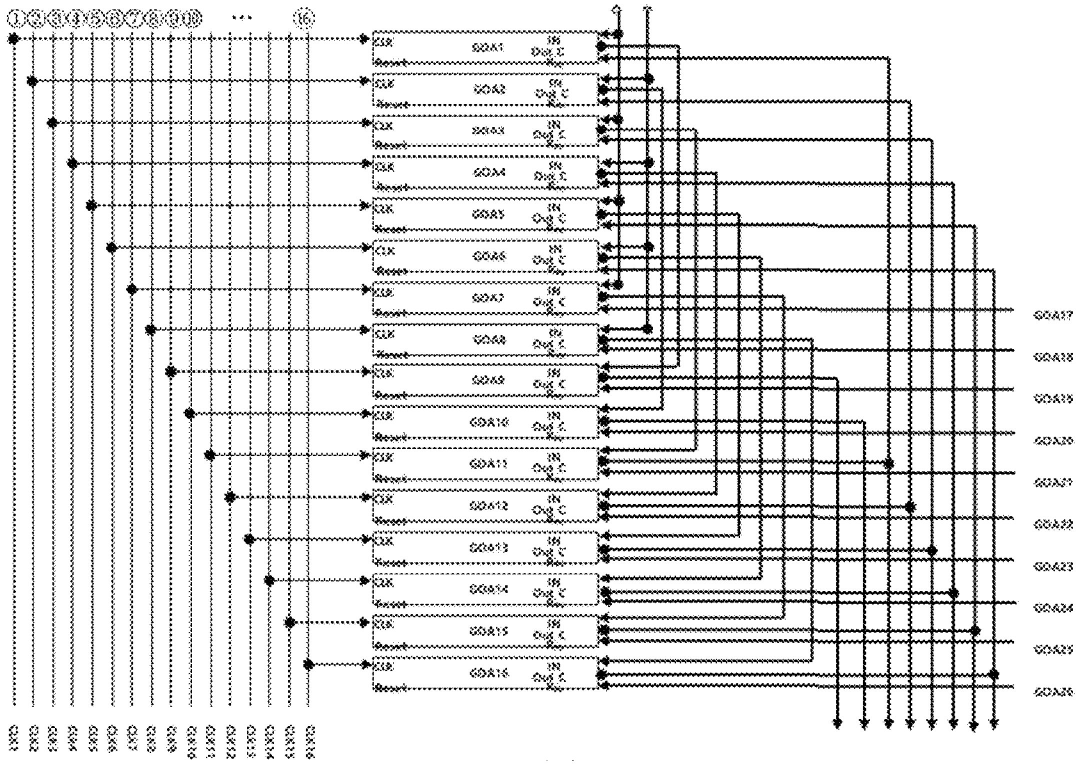
FIG. 14 is a schematic structural diagram illustrating an array substrate driven by 16 clock signals in the related art.
Figure 15:
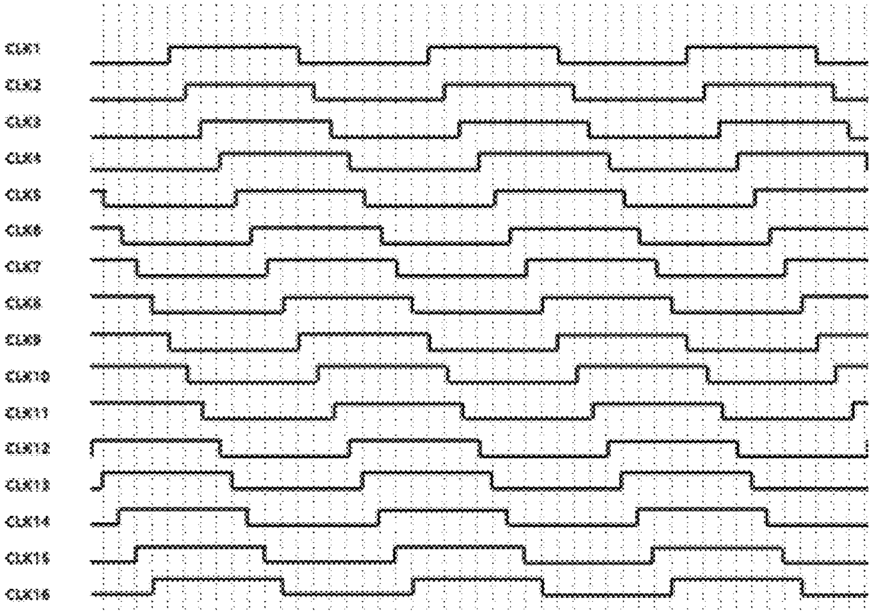
FIG. 15 is a timing diagram of array substrates shown in FIGS. 14 and 16.

FIG. 4 is a schematic structural diagram illustrating an array substrate in the related art, in conjunction with FIGS. 4 and 5, in FIG. 4, the rising edges of clock signals (e.g. CLK1 and CLK2) transmitted in any two adjacent clock signal lines (e.g. a clock signal line marked ① and a clock signal line marked ② differ by ¼ of the time taken by one square wave. In addition, FIGS. 12 and 14 are schematic structural diagrams illustrating another two array substrates in the related art. As shown in conjunction with FIGS. 11 and 12, the rising edges of clock signals (e.g. CLK1 and CLK2) transmitted in any two adjacent clock signal lines (e.g. a clock signal line marked ① and a clock signal line marked ②) differ by ⅓ of the time taken by one square wave. As shown in conjunction with FIGS. 14 and 15, the rising edges of clock signals (e.g. CLK1 and CLK2) transmitted in any two adjacent clock signal lines (e.g. a clock signal line marked ① and a clock signal line marked ②) differ by ⅛ of the time taken by one square wave.

FIG. 8 is a schematic structural diagram illustrating an array substrate provided by an embodiment of the present disclosure. In conjunction with the timing of clock signals in FIG. 5 and the electrical connection mode shown in FIG. 8, in FIG. 8, in the same first signal line group (e.g. the first group G1, the second group G2, the third group G3 and the fourth group G4), a rising edge of a clock signal CLK transmitted by one clock signal line is at the same time as a falling edge of a clock signal CLK transmitted by another clock signal line, and the two clock signal lines in the same first signal line group are arranged to be adjacent to each other.

In FIG. 8, a first group G1 in the first signal line groups includes a first clock signal line (CLK1 line) and a fifth clock signal line (CLK5 line), and in conjunction with the timing sequence of the clock signals in FIG. 5, it can be seen that the polarities of the levels of the clock signal CLK1 and the clock signal CLK5 are opposite to each other, and the falling edge of the clock signal CLK1 is aligned with the rising edge of the clock signal CLK5; and the situations of a second group G2, a third group G3 and a fourth group G4 in the first signal line groups are similar to that of the first group G1, and the description thereof will not be repeated here.

In some embodiments, as shown in FIG. 8, the first group G1, the second group G2, the third group G3 and the fourth group G4 in the first signal line groups are arranged in sequence; in some other embodiments, the fourth group G4, the first group G1, the second group G2, and the third group G3 are arranged in sequence; in some other embodiments, the third group G3, the fourth group G4, the first group G1, and the second group G2 are arranged in sequence; of course, other arrangements are possible and will not be enumerated here.

It should be noted that, in the present specification, CLK, CLK1, CLK2, etc. all represent a clock signal, and a CLK line, a CLK1 line, a CLK2 line, etc. all represent a clock signal line for transmitting a specific clock signal, and the clock signal lines according to the embodiments of the present disclosure are all named and distinguished according to the clock signal transmitted thereon; in addition, in the drawings, relevant marks ①, ② and ③ all represent positions where the clock signal lines are located.

TABLE 1 voltage ripples caused by coupling effects of clock signal lines at different positions
Voltage ripples caused by coupling of CLKs at different locations

| Signal line NO. (position) | Line① | Line② | Line③ | Line④ | Line⑤ | Line⑥ | Line⑦ | Line⑧ |
|---|---|---|---|---|---|---|---|---|
| ↓ Ripple(V) | −0.42 | −0.33 | −0.27 | −0.2 | −0.16 | −0.13 | −0.12 | −0.11 |
| ↑Ripple(V) | 0.37 | 0.31 | 0.24 | 0.18 | 0.14 | 0.12 | 0.11 | 0.1 |

Figure 6:
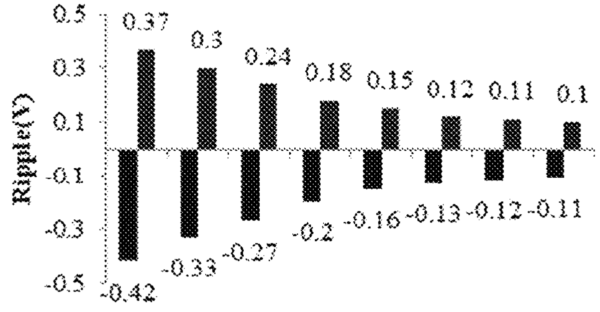
FIG. 6 is a bar graph of voltage ripples generated by the clock signal lines of FIG. 4.
Figure 16:
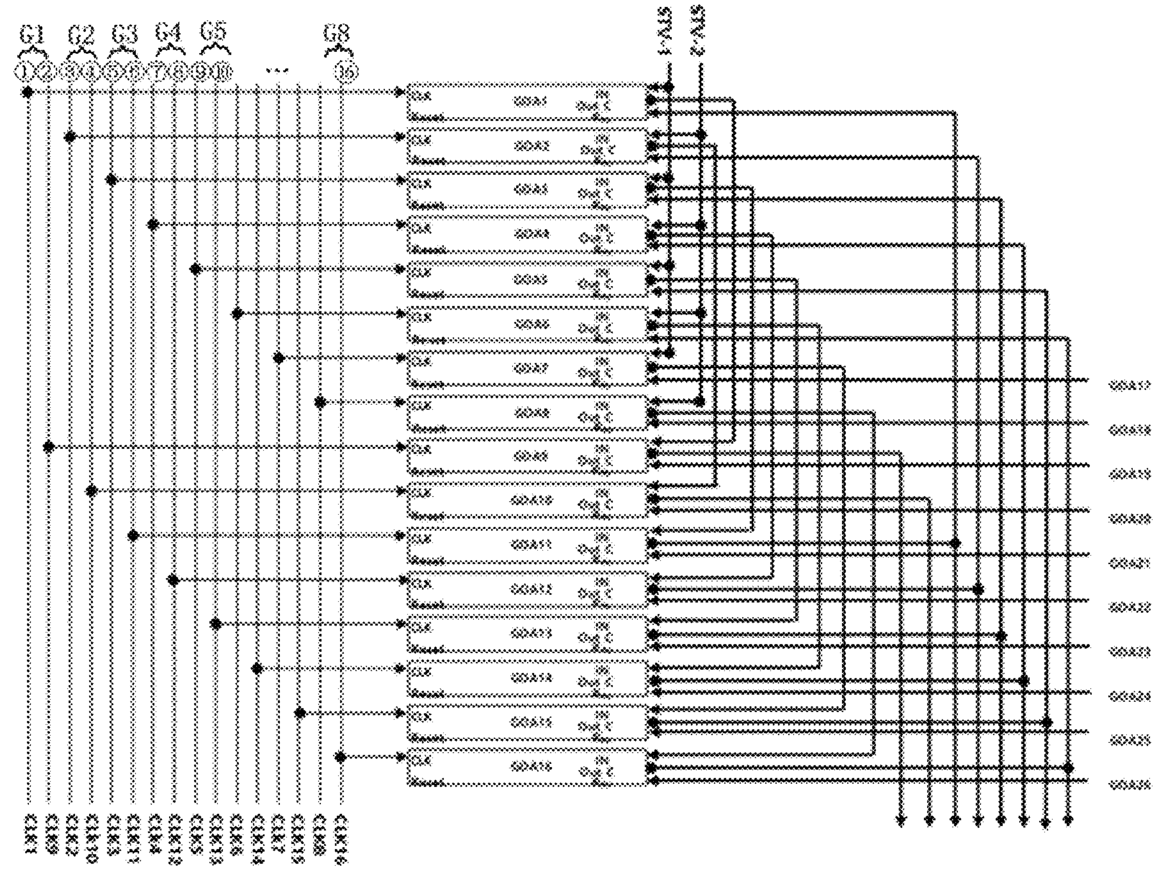
FIG. 16 is a schematic structural diagram illustrating still another array substrate according to an embodiment of the present disclosure.

In the related art, for example, in the array substrate as shown in FIG. 4, since the first clock signal line (CLK1 line), the second clock signal line (CLK2 line), the third clock signal line (CLK3 line), the fourth clock signal line (CLK4 line), the fifth clock signal line (CLKS line), the sixth clock signal line (CLK6 line), the seventh clock signal line (CLK7 line) and the eighth clock signal line (CLK8 line) are arranged in sequence, each clock signal line generates a coupling effect on the common electrode signal line (Vcom line) as shown in FIG. 4. As a result, Vcom signal ripples as shown in FIG. 5 occur on the Vcom signal transmitted in the common electrode signal line. Through a test, the voltage ripples generated by the coupling effects of the clock signal lines located at different positions marked as ①, ② and ③ in FIG. 4 are shown in FIG. 6 and Table 1.

voltage ripple values generated in one signal period by the array substrate as shown in FIG. 16 according to an embodiment of the present disclosure are significantly smaller than the absolute values of the voltage ripple values generated in one signal period by the array substrate of the related art.

TABLE 2 comprehensive coupling of clock signal lines in the related art
Comprehensive coupling of CLKs in the related Art

| | Different time periods | | | | | | | |
|---|---|---|---|---|---|---|---|---|
| | t1 | t2 | t3 | t4 | t5 | t6 | t7 | t8 |
| | Signal line NO. (position) | | | | | | | |
| | Line① | Line② | Line③ | Line④ | Line⑤ | Line⑥ | Line⑦ | Line⑧ |
| Signal | CLK1 | CLK2 | CLK3 | CLK4 | CLK5 | CLK6 | CLK7 | CLK8 |
| Signal coupling manner | Line①↑ + Line⑤↓ | Line②↑ + Line⑥↓ | Line③ 3↑ + Line⑦↓ | Line④↑ + Line⑧↓ | Line①↓ + Line⑤↑ | Line②↓ + Line⑥↑ | Line③↓ + Line⑦↑ | Line④↓ + Line⑧↑ |
| Vcom Ripple(V) | 0.21 | 0.18 | 0.12 | 0.07 | −0.28 | −0.21 | −0.16 | −0.1 |

TABLE 3 comprehensive coupling of clock signal lines in the present application
Comprehensive coupling of CLKs in the present application

| | Different time periods | | | | | | | |
|---|---|---|---|---|---|---|---|---|
| | t1 | t2 | t3 | t4 | t5 | t6 | t7 | t8 |
| | Signal line NO. (position) | | | | | | | |
| | Line① | Line② | Line③ | Line④ | Line⑤ | Line⑥ | Line⑦ | Line⑧ |
| Signal | CLK1 | CLK5 | CLK3 | CLK7 | CLK2 | CLK6 | CLK4 | CLK8 |
| Comprehensive coupling manner | Line①↑ + Line②↓ | Line③↑ + Line④↓ | Line⑤↑ + Line⑥↓ | Line⑦↑ + Line⑧↓ | Line①↓ + Line②↑ | Line③↓ + Line④↑ | Line⑤↓ + Line⑥↑ | Line⑦↓ + Line⑧↑ |
| Vcom Ripple(V) | 0.04 | 0.04 | 0.01 | 0 | −0.11 | −0.09 | −0.04 | −0.02 |

Herein, in the above Tables 2 and 3. ↑ represents a rising edge of the clock signal, and ↓ represents a falling edge of the clock signal.

Figure 10:
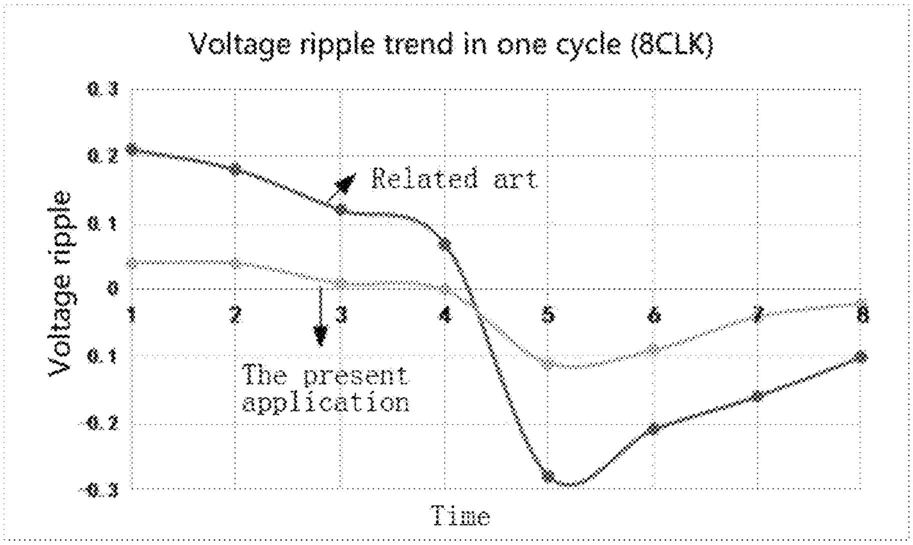
FIG. 10 is a comparison diagram illustrating voltage ripples of a common electrode signal in the array substrates shown in FIG. 4 and FIG. 8.

For the array substrate in the related art as shown in FIG. 4, according to the voltage ripple values generated by the coupling effects of clock signal lines at different positions in Table 1, the voltage ripple values corresponding to the comprehensive coupling of clock signal lines in the related art as shown in Table 2 and the voltage ripple values corresponding to the comprehensive coupling of clock signal lines in the present disclosure as shown in Table 3 can be obtained. According to the voltage ripple values in Tables 2 and 3, a trend graph of voltage ripples in one period as shown in FIG. 10 can be obtained. As can be seen from the voltage ripple trend graph in FIG. 10, the absolute values of the voltage ripple values generated in one signal period by the array substrate according to an embodiment of the present disclosure are significantly smaller than the absolute values of the voltage ripple values generated in one signal period by the array substrate in the related art.

Figure 17:
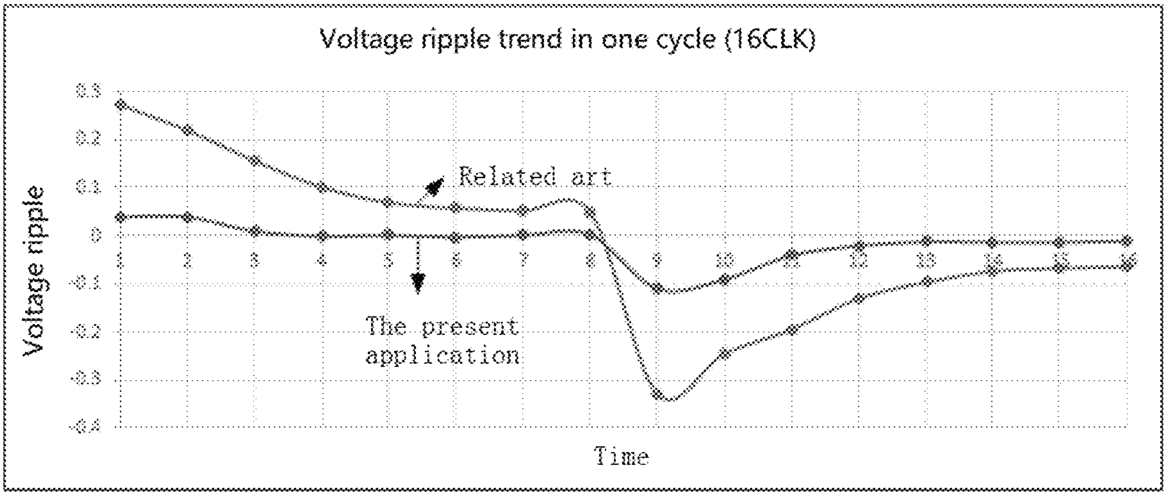
FIG. 17 is a comparison diagram illustrating voltage ripples of a common electrode signal of the array substrate shown in FIGS. 14 and 16.

Moreover, FIG. 17 shows a trend graph of voltage ripples generated in one signal period according to the array substrate of the related art shown in FIG. 14 and a trend graph of voltage ripples generated in one signal period according to another array substrate of the present disclosure shown in FIG. 16 respectively. As can be seen from the trend graphs of voltage ripples in FIG. 17, the absolute values of the According to the embodiment of the present disclosure, clock signals with the rising edge transition and the falling edge transition occurred at the same timing and in opposite directions are loaded on adjacent clock signal lines, so that the influence of the clock signals on the signal with a constant voltage, such as a Vcom signal, is effectively reduced by means of a mechanism that the coupling effects of the clock signals in two adjacent clock signal lines counteract each other. Therefore, the poor display problem caused by the interference of signal ripples in the clock signal lines on other signals is improved, and the display effect is improved.

Figure 7:
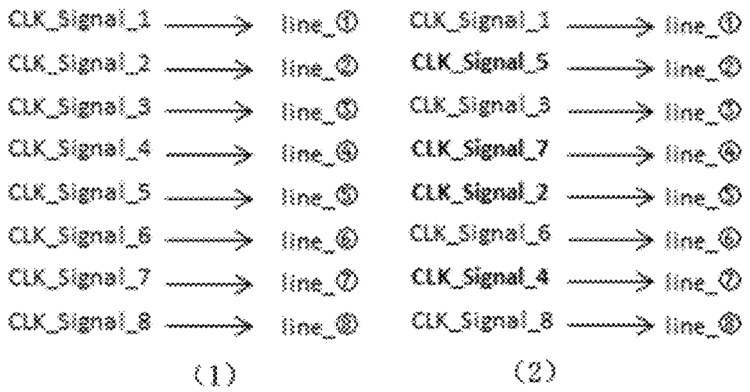
FIG. 7 is a diagram illustrating clock signal input of clock signal lines of the array substrate of FIG. 4 and clock signal input of clock signal lines of an array substrate of FIG. 8.

As shown in chart (1) in FIG. 7, in the related art, clock signal CLK1 (CLK Signal 1)~clock signal CLK8 (CLK Signal 8) are respectively input to the signal lines at the positions marked ①-⑦ in sequence. As shown in chart (2) in FIG. 7, according to some embodiments of the present disclosure, clock signal CLK1 (CLK Signal 1), clock signal CLK5 (CLK Signal 5), clock signal CLK3 (CLK Signal 3), clock signal CLK7 (CLK Signal 7), clock signal CLK2 (CLK Signal 2), clock signal CLK6 (CLK Signal 6), clock signal CLK4 (CLK Signal 4) and clock signal CLK8 (CLK Signal 8) are respectively input to the signal lines at the positions marked ①-⑦ in sequence, that is to say, signal lines at the positions marked ①-⑦ are respectively the first clock signal line, the fifth clock signal line, the third clock signal line, the seventh clock signal line, the second clock signal line, the sixth clock signal line, the fourth clock signal line and the eighth clock signal line in sequence.

Figure 9:
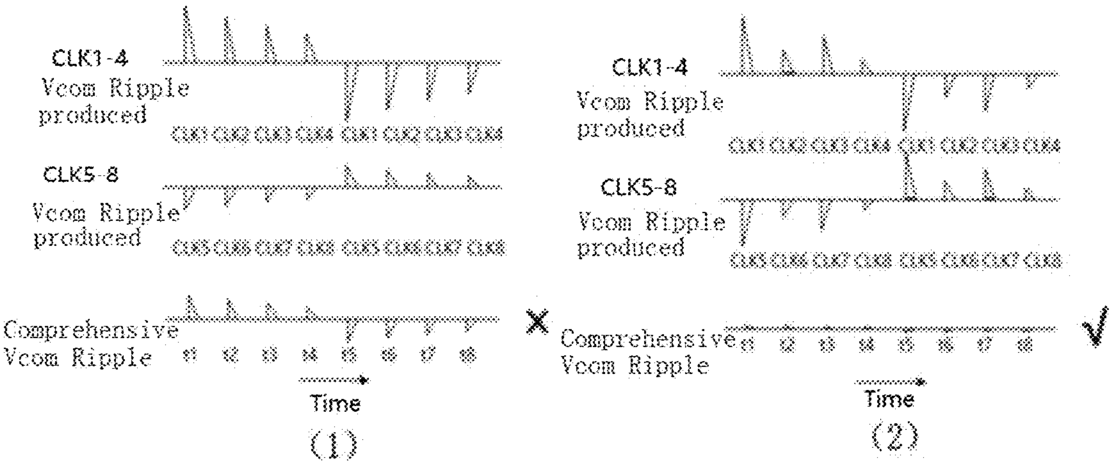
FIG. 9 is a schematic diagram illustrating a coupling effect of a clock signal in each clock signal line of the array substrate in FIG. 4 on a common electrode signal and a coupling effect of a clock signal in each clock signal line of the array substrate in FIG. 8 on a common electrode signal.

The coupling manner of signal lines in Tables 2 and 3 will be described in detail with reference to chart (1) and chart (2) of FIG. 9. As can be seen from chart (1) and chart (2) of FIG. 9, no matter the positions of the clock signal lines, the clock signal CLK1 is coupled with the clock signal CLK5, the clock signal CLK2 is coupled with the clock signal CLK6, the clock signal CLK3 is coupled with the clock signal CLK7, and the clock signal CLK4 is coupled with the clock signal CLK8; since the arrangement of the clock signal lines in the related art as shown in FIG. 4 is different from the arrangement of the clock signal lines as shown in FIG. 8 according to an embodiment of the present disclosure, the comprehensive coupling manner column in Table 2 is different from the comprehensive coupling manner column in Table 3. Further, it can be seen from a trend of the comprehensive Vcom voltage ripple (Vcom Ripple) as shown in chart (1) and (2) of FIG. 9, the array substrate provided by the embodiments of the present disclosure can effectively reduce the interference of the clock signals on a signal with a constant voltage through the mechanism that the coupling effects of clock signals in two adjacent clock signal lines counteract each other. Therefore, the stability of the signal with a constant voltage is improved, thereby improving the circuit stability of the array substrate and improving the display effect.

In some embodiments of the present disclosure, as shown in FIG. 8, the peripheral area BB further includes at least one second signal line (for example, a common electrode signal line, Vcom line), the second signal line extends in the same direction as the clock signal line, and the signal transmitted in the second signal line is a constant voltage signal. The minimum distance between the second signal line and the clock signal line is less than or equal to a preset value, and the preset value ranges from 1 μm to 5 cm.

For example, the preset value may be 1 μm, 2 μm, 3 μm, 4 μm, 5 μm, 6 μm, 7 μm, 100 μm, 200 μm, 500 μm, 800 μm, 1 μcm, 2 cm, 3 cm or 4 cm.

It should be noted that, in the case where there are multiple second signal lines, since the minimum distance between each second signal line and the clock signal line is different, the magnitude of the coupling effect of the clock signal line on each second signal line is different, and thus the magnitude of the voltage ripple generated on each second signal line is different. Therefore, based on the mechanism of the embodiments of the present disclosure that the coupling effects of clock signals transmitted by two adjacent clock signal lines in the same group in the first signal line groups counteract each other, the degree of improvement of the voltage ripple on each second signal line is different.

In some embodiments of the present disclosure, the second signal line includes at least one of a common signal line, a first power signal line (VDD1 line), a second power signal line (VDD2 line), a first level signal line (VSS1 line), a second level signal line (VSS2 line), and a ground line (GND line).

In some embodiments of the present disclosure, the common signal line includes the common electrode signal line (Vcom line), the common electrode feedback signal line (Feed line), and the common electrode compensation signal line (Vcom-b1 line or Vcom-b2 line), and the common electrode signal line (Vcom line), the common electrode feedback signal line (Feed line) and the common electrode compensation signal line (Vcom-b1 line or Vcom-b2 line) are electrically connected together. In addition, the common electrode signal line (Vcom line), the common electrode feedback signal line (Feed line), and the common electrode compensation signal line (Vcom-b1 line or Vcom-b2 line) are also electrically connected to the driving chip of the display panel, respectively.

In an exemplary embodiment, the array substrate includes a plurality of common electrode signal lines (Vcom line) arranged in an array, and the common electrode signal line (Vcom line) extends from the display area AA to the peripheral area BB; the common electrode feedback signal line (Feed line) and the common electrode compensation signal line (Vcom-b1 line or Vcom-b2 line) are located in the peripheral area BB.

In practical applications, with regard to any second signal line located around the clock signal line, since the signal transmitted in the clock signal line is a square wave signal, while the signal transmitted in the second signal line is a signal with a constant voltage, the electrical signal with a constant voltage in the second signal line is easily to be interfered by the signal in the clock signal line, resulting in voltage ripples. As a result, the electrical signal with a constant voltage becomes unstable, so that the stability of the circuit in the array substrate is reduced and the display is abnormal.

For a liquid crystal display panel, when ripples occur on the signal transmitted in a common signal line, a difference between the common voltage signal Vcom and a voltage signal of a pixel electrode fluctuates, so that deflections of liquid crystals in a local area are abnormal, and a problem of uneven brightness occurs in the display panel. The problem of uneven brightness includes but is not limited to bright stripes, dark stripes, transverse stripes, vertical stripes, flicker, etc.

For an OLED display panel, when signal ripples occur in at least one of the first power supply signal line (VDD1 line), the second power supply signal line (VDD2 line), the first level signal line (VSS1 line), the second level signal line (VSS2 line) and the ground line (GND line), a circuit such as a Gate GOA driving circuit and an EM GOA driving circuit becomes unstable due to the signal ripples, so that the anode voltage for controlling the pixel unit to emit light is unstable, that is, the display panel also has a problem of uneven brightness. The principle of uneven brightness occurred in other types of display panels is similar to that described above and will not be repeated.

According to the embodiment of the present disclosure, a phase of a clock signal transmitted by one clock signal line in a first signal line group is opposite to a phase of a clock signal transmitted by another clock signal line in the same first signal line group, and the two clock signal lines in the same first signal line group are arranged to be adjacent to each other. In this way, when the minimum distance between a second signal line and the clock signal line is less than or equal to a pre-set value, the voltage ripples on each second signal line are improved due to the mechanism that the coupling effects of the clock signals transmitted by two adjacent clock signal lines in the same first signal line group counteract each other, and the problem of the constant voltage signal ripples is greatly reduced, thereby improving the display effect.

The second signal lines are located on a side of each of the first signal line groups facing away from the display area AA; and/or, the second signal lines are located on a side of each of the first signal line groups closing to the display area AA.

In some embodiments, each second signal line is located on a side of each first signal line group facing away from the display area AA.

Figure 13:
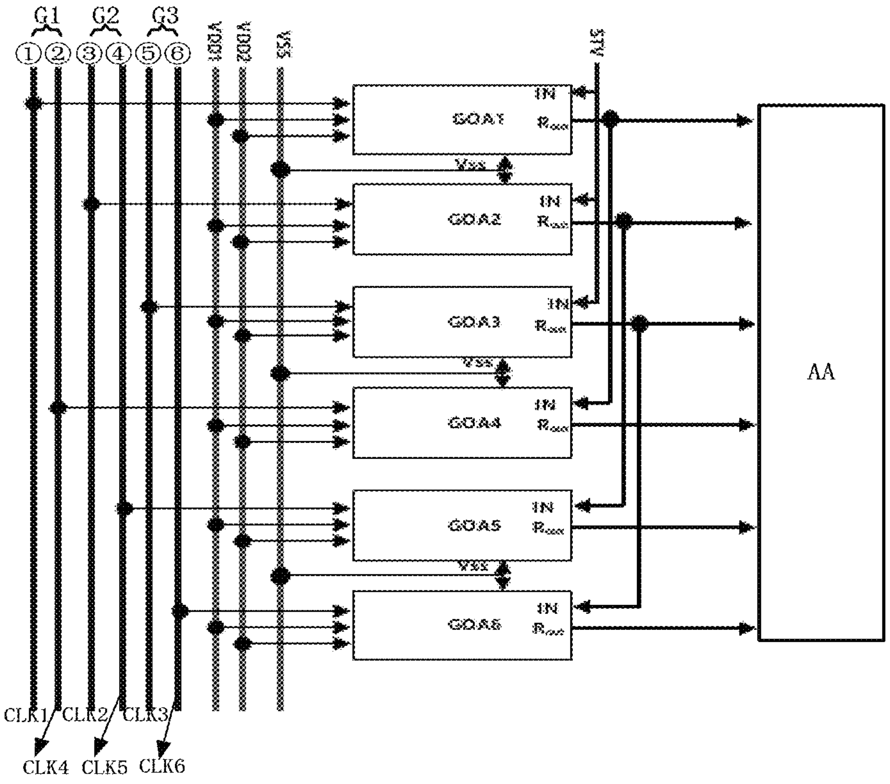
FIG. 13 is a schematic structural diagram illustrating another array substrate according to an embodiment of the present disclosure.

In some embodiments, as shown in FIGS. 12 and 13, each second signal line is located on a side of each first signal line group closing to the display area AA.

In some embodiments, as shown in FIG. 8, some of the second signal lines are located on a side of each of the first signal line groups facing away from the display area, and some of the second signal lines are located on a side of each of the first signal line groups closing to the display area.

In some embodiments of the present disclosure, as shown in FIGS. 8, 13 and 16, the peripheral area BB includes a plurality of shift register unit groups. Each of the shift register unit groups includes the same number of shift register unit GOAs. The number of shift register cell GOAs in the same shift register cell group is the same as the number of clock signal lines. The shift register cells are located at a side of the first signal line groups closing to the display area AA.

In an exemplary embodiment, as shown in FIG. 8, the array substrate includes 8 clock signal lines, and one shift register cell group includes 8 shift register unit GOAs, and the 8 shift register unit GOAs are electrically connected to the 8 clock signal lines respectively. In an exemplary embodiment, as shown in FIG. 13, the array substrate includes 6 clock signal lines, and one shift register cell group includes 6 shift register unit GOAs, and the 6 shift register unit GOAs are electrically connected to the 6 clock signal lines respectively. In an exemplary embodiment, as shown in FIG. 16, the array substrate includes 16 clock signal lines, and one shift register unit group includes 16 shift register unit GOAs, and the 16 shift register unit GOAs are electrically connected to the 16 clock signal lines respectively. In a case where one shift register unit group includes N shift register unit GOAs arranged in cascade, one clock signal line in a first signal line group is electrically connected to the shift register unit at the n-th stage, and the other clock signal line in the same first signal line group is electrically connected to the shift register unit at the (n+N/2)-th stage; n is less than or equal to N/2, and n is odd and N is even. For example, N may include 4, 6, 8, 10, 12, 16, and 20.

In an exemplary embodiment, as shown in FIG. 8, the array substrate includes 8 clock signal lines, and one shift register unit group includes 8 shift register unit GOAs. In the first group G1 in the first signal line groups, the first clock signal line (CLK1 line) is electrically connected to a first-stage shift register unit GOA1, and the fifth clock signal line (CLK5 line) is electrically connected to a fifth-stage shift register unit GOA5; in a second group G2 in the first signal line groups, the third clock signal line (CLK3 line) is electrically connected to a third-stage shift register unit GOA3, and the seventh clock signal line (CLK7 line) is electrically connected to a seventh-stage shift register unit GOA7; in the third group G3 in the first signal line groups, the fourth clock signal line (CLK4 line) is electrically connected to a fourth-stage shift register unit GOA4, and the sixth clock signal line (CLK6 line) is electrically connected to a sixth-stage shift register unit GOA6; in the fourth group G4 in the first signal line groups, the second clock signal line (CLK2 line) is electrically connected to a second-stage shift register unit GOA2, and the eighth clock signal line (CLK8 line) is electrically connected to an eighth-stage shift register unit GOA8. Moreover, frequencies of signals in two clock signal lines in the same first signal line group are the same.

In an exemplary embodiment, as shown in FIG. 13, the array substrate includes 6 clock signal lines, and one shift register unit group includes 6 shift register unit GOAs. In the first group G1 in the first signal line groups, the first clock signal line (CLK1 line) is electrically connected to a first-stage shift register unit GOA1, and the fourth clock signal line (CLK4 line) is electrically connected to a fourth-stage shift register unit GOA4; in the second group G2 in the first signal line groups, the second clock signal line (CLK2 line) is electrically connected to a second-stage shift register unit GOA2, and the fifth clock signal line (CLK5 line) is electrically connected to a fifth-stage shift register unit GOA5; in the third group G3 in the first signal line groups, the third clock signal line (CLK3 line) is electrically connected to a third-stage shift register unit GOA3, and the sixth clock signal line (CLK6 line) is electrically connected to a sixth-stage shift register unit GOA6.

In an exemplary embodiment, as shown in FIG. 16, the array substrate includes 16 clock signal lines, and one shift register unit group includes 16 shift register unit GOAs. In the first group G1 in the first signal line groups, the first clock signal line (CLK1 line) is electrically connected to a first-stage shift register unit GOAL, and the ninth clock signal line (CLK9 line) is electrically connected to a ninth-stage shift register unit GOA9; in the second group G2 in the first signal line groups, the second clock signal line (CLK2 line) is electrically connected to a second-stage shift register unit GOA2, and the tenth clock signal line (CLK10 line) is electrically connected to a tenth-stage shift register unit GOA10; in the third group G3 in the first signal line groups, the third clock signal line (CLK3 line) is electrically connected to a third-stage shift register unit GOA3, and the eleventh clock signal line (CLK11 line) is electrically connected to an eleventh-stage shift register unit GOA11: in the fourth group G4 in the first signal line groups, the fourth clock signal line (CLK4 line) is electrically connected to a fourth-stage shift register unit GOA4, and the twelfth clock signal line (CLK12 line) is electrically connected to a twelfth-stage shift register unit GOA12; in the fifth group G5 in the first signal line groups, the fifth clock signal line (CLK5 line) is electrically connected to a fifth-stage shift register unit GOAS, and the thirteenth clock signal line (CLK13 line) is electrically connected to a thirteenth-stage shift register unit GOA13; in the sixth group G6 in the first signal line groups, the sixth clock signal line (CLK6 line) is electrically connected to a sixth-stage shift register unit GOA6, and the fourteenth clock signal line (CLK14 line) is electrically connected to a fourteenth-stage shift register unit GOA14: in a seventh group G7 in the first signal line groups, the seventh clock signal line (CLK7 line) is electrically connected to a seventh-stage shift register unit GOA7, and the fifteenth clock signal line (CLK15 line) is electrically connected to a fifteenth-stage shift register unit GOA15; in the eighth group G8 in the first signal line groups, the eighth clock signal line (CLK8 line) is electrically connected to an eighth-stage shift register unit GOA8, and the sixteenth clock signal line (CLK16 line) is electrically connected to a sixteenth-stage shift register unit GOA16.

The cascading manner of the GOA units of each stage is described below. Taking FIG. 13 as an example, a STV signal transmitted in a STV signal line is served as an enable signal input of the first-stage shift register unit GOAL, the second-stage shift register unit GOA2 and the third-stage shift register unit GOA3; an output signal of the first-stage shift register unit GOAL is input into the display area AA on the one hand, and is served as an input signal of the fourth-stage shift register unit GOA4 on the other hand; an output signal of the second-stage shift register unit GOA2 is input into the display area AA on the one hand, and is served as an input signal of the fifth-stage shift register unit GOA5 on the other hand; an output signal of the third-stage shift register unit GOA3 is input into the display area AA on the one hand, and is served as an input signal of the sixth-stage shift register unit GOA6 on the other hand. GOA units are cascaded in a way in FIGS. 8 and 16 similar to that described herein, with particular reference to the related art, and will not be described in detail herein.

In some embodiments of the present disclosure, the peripheral area includes M first signal line groups, and the first signal line group includes an m-th clock signal line and a (m+M)-th clock signal line, where M includes at least one of 3, 4, 5, 6, 8 or 10, m is less than or equal to M, and m is a positive integer.

For example, the peripheral area includes 3 first signal line groups (M=3), and when m=1. the first signal line group includes the first clock signal line (CLK1 line) and the fourth clock signal line (CLK4 line); when m=2, the first signal line group includes the second clock signal line (CLK2 line) and the fifth clock signal line (CLK5 line): when m=3, the first signal line group includes the third clock signal line (CLK3 line) and the sixth clock signal line (CLK6 line). Further, when the peripheral area includes 4, 5, 6, 8, or 10 first signal line groups (M=4, 5, 6, 8, or 10), the clock signal lines included in the first signal line group are similar to that described above, and will not be described again.

The manner in which each of the above-mentioned first signal line groups is arranged is not limited. For example, taking a 6-CLK line-driving as shown in FIG. 13 as an example, the 1st first signal line group includes the first clock signal line (CLK1 line) and the fourth clock signal line (CLK4 line), the 2nd first signal line group includes the second clock signal line (CLK2 line) and the fifth clock signal line (CLK5 line), and the 3rd first signal line group includes the third clock signal line (CLK3 line) and the sixth clock signal line (CLK6 line). As long as clock signal lines in the same group are arranged to be adjacent to each other, the arrangement positions of two groups can be changed and adjusted. It needs to be stated, when clock signal lines in the same group are arranged to be adjacent to each other, the first clock signal line in the group can be arranged on the left side, and the second clock signal line in the same group can be arranged on the right side; alternatively, it is also possible to arrange the first clock signal line on the right side and arrange the second clock signal line in the same group on the left side.

In an exemplary embodiment, the first signal line groups are sequentially arranged in a first direction. The first direction is a direction pointing to the display area AA from the peripheral area BB, or the first direction is a direction pointing to the peripheral area BB from the display area AA.

Table 4 shows the arrangement of clock signal lines for two types of 6CLK line-driving in the related art and the arrangement of clock signal lines, provided from the peripheral area BB to the display area AA, for 48 types of 6CLK line-driving provided by embodiments of the present disclosure. The clock signal lines for 8CLK line-driving, 10CLK line driving, 12CLK line driving, 16CLK line driving and 20CLK line driving can also be set with reference to the arrangement in Table 4. It should be noted that the arrangement of clock signal lines for 8CLK line driving, 10CLK line driving, 12CLK line driving, 16CLK line driving and 20CLK line driving includes 24×4×3×2×1, 25×5×4×3×2×1, 26×6×5×4×3×2×1, 28×8×7×6×5×4’3×2×1, 210×10×9×8×7×6×5×4×3×2×1 schemes respectively.

TABLE 4

Arrangement of clock signal lines when driven by 6CLK signals
For 6CLK driving, distribution of CLK signals loaded on signal lines at different positions

| | Signals loaded by signal lines at different positions | | | | | |
|---|---|---|---|---|---|---|
| | Line① | Line② | Line③ | Line④ | Line⑤ | Line⑥ |
| Related Art 1 | CLK1 | CLK2 | CLK3 | CLK4 | CLK5 | CLK6 |
| Related Art 2 | CLK6 | CLK5 | CLK4 | CLK3 | CLK2 | CLK1 |
| The present application 6-1 | CLK1 | CLK4 | CLK2 | CLK5 | CLK3 | CLK6 |
| The present application 6-2 | CLK1 | CLK4 | CLK2 | CLK5 | CLK6 | CLK3 |
| The present application 6-3 | CLK1 | CLK4 | CLK5 | CLK2 | CLK3 | CLK6 |
| The present application 6-4 | CLK1 | CLK4 | CLK5 | CLK2 | CLK6 | CLK3 |
| The present application 6-5 | CLK4 | CLK1 | CLK2 | CLK5 | CLK3 | CLK6 |
| The present application 6-6 | CLK4 | CLK1 | CLK2 | CLK5 | CLK6 | CLK3 |
| The present application 6-7 | CLK4 | CLK1 | CLK5 | CLK2 | CLK3 | CLK6 |
| The present application 6-8 | CLK4 | CLK1 | CLK5 | CLK2 | CLK6 | CLK3 |
| The present application 6-9 | CLK1 | CLK4 | CLK3 | CLK6 | CLK2 | CLK5 |
| The present disclosure 6-10 | CLK1 | CLK4 | CLK6 | CLK3 | CLK2 | CLK5 |
| The present disclosure 6-11 | CLK1 | CLK4 | CLK3 | CLK6 | CLK5 | CLK2 |
| The present disclosure 6-12 | CLK1 | CLK4 | CLK6 | CLK3 | CLK5 | CLK2 |
| The present disclosure 6-13 | CLK4 | CLK1 | CLK3 | CLK6 | CLK2 | CLK5 |
| The present disclosure 6-14 | CLK4 | CLK1 | CLK6 | CLK3 | CLK2 | CLK5 |
| The present disclosure 6-15 | CLK4 | CLK1 | CLK3 | CLK6 | CLK5 | CLK2 |
| The present disclosure 6-16 | CLK4 | CLK1 | CLK6 | CLK3 | CLK5 | CLK2 |
| The present disclosure 6-17 | CLK3 | CLK6 | CLK1 | CLK4 | CLK2 | CLK5 |
| The present disclosure 6-18 | CLK6 | CLK3 | CLK1 | CLK4 | CLK2 | CLK5 |
| The present disclosure 6-19 | CLK3 | CLK6 | CLK1 | CLK4 | CLK5 | CLK2 |
| The present disclosure 6-20 | CLK6 | CLK3 | CLK1 | CLK4 | CLK5 | CLK2 |
| The present disclosure 6-21 | CLK3 | CLK6 | CLK4 | CLK1 | CLK2 | CLK5 |
| The present disclosure 6-22 | CLK6 | CLK3 | CLK4 | CLK1 | CLK2 | CLK5 |
| The present disclosure 6-23 | CLK3 | CLK6 | CLK4 | CLK1 | CLK5 | CLK2 |
| The present disclosure 6-24 | CLK6 | CLK3 | CLK4 | CLK1 | CLK5 | CLK2 |
| The present disclosure 6-25 | CLK3 | CLK6 | CLK2 | CLK5 | CLK1 | CLK4 |
| The present disclosure 6-26 | CLK3 | CLK6 | CLK2 | CLK5 | CLK1 | CLK4 |
| The present disclosure 6-27 | CLK3 | CLK6 | CLK5 | CLK2 | CLK1 | CLK4 |
| The present disclosure 6-28 | CLK6 | CLK3 | CLK5 | CLK2 | CLK1 | CLK4 |

TABLE 4-continued

Arrangement of clock signal lines when driven by 6CLK signals
For 6CLK driving, distribution of CLK signals loaded on signal lines at different positions

| | Signals loaded by signal lines at different positions | | | | | |
|---|---|---|---|---|---|---|
| | Line① | Line② | Line③ | Line④ | Line⑤ | Line⑥ |
| The present disclosure 6-29 | CLK3 | CLK6 | CLK2 | CLK5 | CLK4 | CLK1 |
| The present disclosure 6-30 | CLK6 | CLK3 | CLK2 | CLK5 | CLK4 | CLK1 |
| The present disclosure 6-31 | CLK3 | CLK6 | CLK5 | CLK2 | CLK4 | CLK1 |
| The present disclosure 6-32 | CLK6 | CLK3 | CLK5 | CLK2 | CLK4 | CLK1 |
| The present disclosure 6-33 | CLK2 | CLK5 | CLK3 | CLK6 | CLK1 | CLK4 |
| The present disclosure 6-34 | CLK2 | CLK5 | CLK6 | CLK3 | CLK1 | CLK4 |
| The present disclosure 6-35 | CLK5 | CLK2 | CLK3 | CLK6 | CLK1 | CLK4 |
| The present disclosure 6-36 | CLK5 | CLK2 | CLK6 | CLK3 | CLK1 | CLK4 |
| The present disclosure 6-37 | CLK2 | CLK5 | CLK3 | CLK6 | CLK4 | CLK1 |
| The present disclosure 6-38 | CLK2 | CLK5 | CLK6 | CLK3 | CLK4 | CLK1 |
| The present disclosure 6-39 | CLK5 | CLK2 | CLK3 | CLK6 | CLK4 | CLK1 |
| The present disclosure 6-40 | CLK5 | CLK2 | CLK6 | CLK3 | CLK4 | CLK1 |
| The present disclosure 6-41 | CLK2 | CLK5 | CLK1 | CLK4 | CLK3 | CLK6 |
| The present disclosure 6-42 | CLK2 | CLK5 | CLK1 | CLK4 | CLK6 | CLK3 |
| The present disclosure 6-43 | CLK5 | CLK2 | CLK1 | CLK4 | CLK3 | CLK6 |
| The present disclosure 6-44 | CLK5 | CLK2 | CLK1 | CLK4 | CLK6 | CLK3 |
| The present disclosure 6-45 | CLK2 | CLK5 | CLK4 | CLK1 | CLK3 | CLK6 |
| The present disclosure 6-46 | CLK2 | CLK5 | CLK4 | CLK1 | CLK6 | CLK3 |
| The present disclosure 6-47 | CLK5 | CLK2 | CLK4 | CLK1 | CLK3 | CLK6 |
| The present disclosure 6-48 | CLK5 | CLK2 | CLK4 | CLK1 | CLK6 | CLK3 |

In some embodiments of the present disclosure, as shown in FIG. 13, the peripheral area BB includes 3 first signal line groups. The first group G1 among the first signal line groups includes the first clock signal line (CLK1 line) and the fourth clock signal line (CLK4 line), the second group G2 among the first signal line groups includes the second clock signal line (CLK2 line) and the fifth clock signal line (CLK5 line), and the third group G3 among the first signal line groups includes the third clock signal line (CLK3 line) and the sixth clock signal line (CLK6 line). The first group G1, the second group G2, and the third group G3 among the first signal line groups are sequentially arranged in the first direction, respectively. Here, in FIG. 13, the first direction is the direction pointing to the display area AA from the peripheral area BB, or, in other embodiments, the first direction is the direction pointing to the peripheral area BB from the display area AA.

In some embodiments of the present disclosure, as shown in FIG. 13, the first clock signal line (CLK1 line), the fourth clock signal line (CLK4 line), the second clock signal line (CLK2 line), the fifth clock signal line (CLKS line), the third clock signal line (CLK3 line) and the sixth clock signal line (CLK6 line) are arranged in sequence along the first direction.

In other embodiments, the fourth clock signal line (CLK4 line), the first clock signal line (CLK1 line), the fifth clock signal line (CLK5 line), the second clock signal line (CLK2 line), the sixth clock signal line (CLK6 line), and the third clock signal line (CLK3 line) are arranged in sequence along the first direction.

In some embodiments of the present disclosure, the array substrate includes a substrate, and a first conductive layer and a second conductive layer disposed on the substrate, and the second conductive layer is disposed on a side of the first conductive layer facing away from the substrate.

In an exemplary embodiment, the first conductive layer may be a gate layer (Gate), and the second conductive layer may be a source-drain metal layer (SD).

Figure 18:
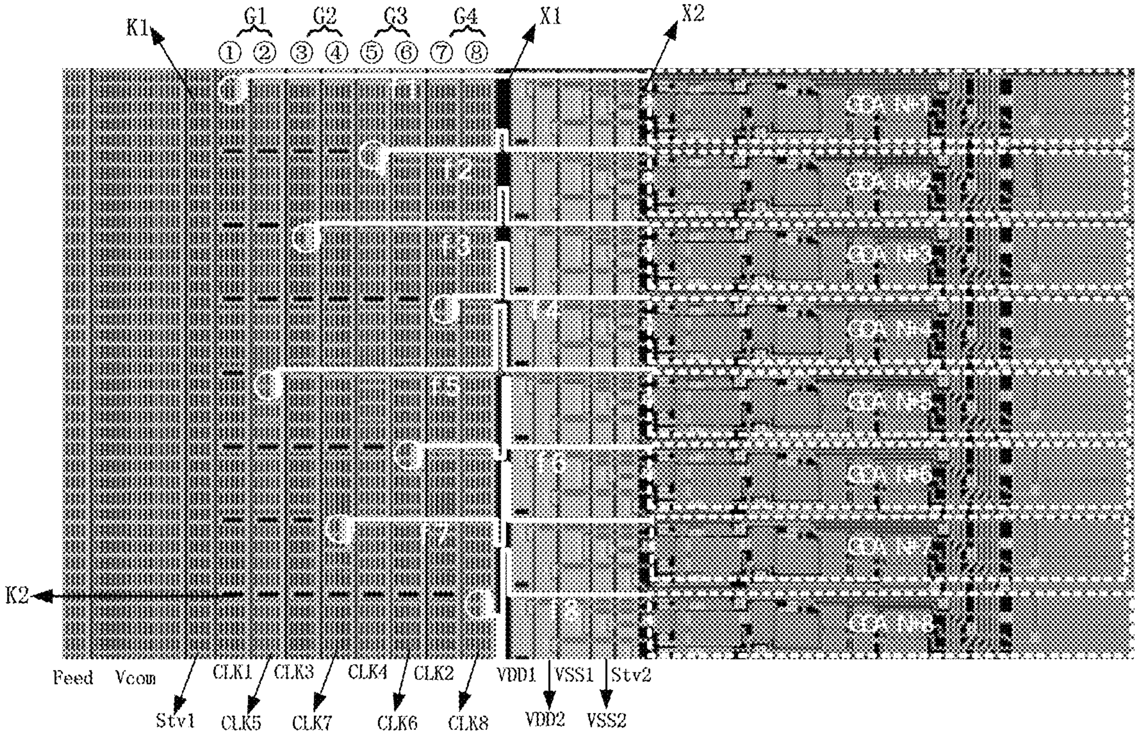
FIG. 18 is a design layout of a local area of a perimeter region of an array substrate according to an embodiment of the present disclosure.

As shown in FIG. 18, the first conductive layer includes the first signal line groups, and the second conductive layer includes a plurality of clock signal auxiliary lines (for example, traces marked as f1, f2 . . . ). An extension direction of at least some segments of the clock signal auxiliary line intersects with the first signal line groups; wherein a part of each clock signal line in the first signal line groups shown in FIG. 18 extends in a vertical direction; the part of the clock signal auxiliary line overlapping with the clock signal lines extends in a horizontal direction.

In an exemplary embodiment, as shown in FIG. 18, the clock signal line includes a plurality of first openings K1 and a plurality of second openings K2, the number of first openings K1 being greater than the number of second openings K2; an orthographic projection of at least a part of the clock signal auxiliary lines (e.g. traces marked as f1, f2 . . . ) on the substrate overlaps with the region delineated by the orthographic projection of an outer contour of the second opening K2 on the substrate.

Here, no first opening K1 and second opening K2 are provided at a position where the clock signal line is electrically connected to the clock signal auxiliary line (for example an area marked with a circle in FIG. 18), but vias are provided at such position to electrically connect the clock signal line to the clock signal auxiliary line.

For example, the area of the region delineated by the orthographic projection of the outer contour of the second opening K2 on the substrate is larger than the area of the region delineated by the orthographic projection of the outer contour of the first opening K1 on the substrate.

For example, each signal line located at the side of the clock signal lines facing away from the display area AA includes a plurality of first openings K1. By providing the first openings K1, on one hand, the light transmission rate of this region can be improved, so that the transmission rate of ultraviolet light during the curing stage of the frame sealant is improved, and the curing rate of the frame sealant is improved; on the other hand, the openings can improve the heat dissipation efficiency of the traces in the peripheral area BB, thereby improving the stability of the circuit of the peripheral area BB.

In addition, by providing the second opening K2 on the clock signal line, the orthographic projections of at least a part of the clock signal auxiliary lines (e.g. the traces marked as f1, f2 . . . ) on the substrate overlap with the region delineated by the orthographic projection of the outer contour of the second opening K2 on the substrate. Therefore, it is possible to reduce the overlapping area between the clock signal auxiliary lines located at the second conductive layer and the clock signal lines located at the first conductive layer, thereby greatly reducing the parasitic capacitance generated therebetween, and further improving the stability of the circuit.

The orthographic projections of at least some of the clock signal auxiliary lines (e.g. the traces marked as f1, f2 . . . ) on the substrate overlap with the region delineated by the orthographic projection of the outer contour of the second opening K2 on the substrate in ways including but not limited to:

in the first way, there is an overlap between the orthographic projections of some of the clock signal auxiliary lines (e.g. the traces marked as f1, f2 . . . ) on the substrate and the region delineated by the orthographic projection of the outer contour of the second opening K2 on the substrate;

in the second way, the orthographic projection of each of the clock signal auxiliary lines (e.g. the traces marked as f1, f2 . . . ) on the substrate overlaps with the region delineated by the orthographic projection of the outer contour of the second opening K2 on the substrate.

It should be noted that the number of second openings K2 is not limited here and can be determined in particular on the basis of the actual circuit design.

For example, the number of the clock signal auxiliary lines are the same as the number of the clock signal lines: the number of clock signal auxiliary lines corresponding to one shift register group is the same as the number of clock signal lines.

For example, as shown in FIG. 18, the first clock signal line (CLK1 line) is electrically connected to the first-stage shift register GOAL through a first clock signal auxiliary line f1; the second clock signal line (CLK2 line) is electrically connected to the second-stage shift register GOA2 through a second clock signal auxiliary line f2; the third clock signal line (CLK3 line) is electrically connected to the third-stage shift register GOA3 through a third clock signal auxiliary line f3; and the fourth clock signal line (CLK4 line) is electrically connected to the fourth-stage shift register GOA4 through a fourth clock signal auxiliary line f4; the fifth clock signal line (CLK5 line) is electrically connected to the fifth-stage shift register GOA5 through a fifth clock signal auxiliary line f5; the sixth clock signal line (CLK6 line) is electrically connected to the sixth-stage shift register GOA6 through a sixth clock signal auxiliary line f6; the seventh clock signal line (CLK7 line) is electrically connected to the seventh-stage shift register GOA7 through a seventh clock signal auxiliary line f7; and the eighth clock signal line (CLK8 line) is electrically connected to the eighth-stage shift register GOA8 through an eighth clock signal auxiliary line f8.

In some embodiments of the present disclosure, as shown in FIG. 18, the peripheral area BB includes a first gap X1 located between the shift register unit group and the first signal line groups, and the extension direction of the first gap X1 is the same as the extension direction of the clock signal line.

Some of the clock signal auxiliary lines (e.g. the traces marked as f1, f2 . . . ) each includes a meander structure, and the meander structure of each clock signal auxiliary line has different sizes in the orthographic projection pattern on the substrate, and each meander structure is located in the first gap X1.

For example, in FIG. 18, each of the clock signal auxiliary lines other than the first clock signal auxiliary line f1 includes a meander structure. Each of the meander structures is different in size according to the difference in the minimum distance, along the direction pointing to the display area AA from the peripheral area BB, between each of the clock signal auxiliary lines and the transistor (the transistor in the GOA unit) in direct contact therewith, to compensate for the resistance difference due to the difference in length, thereby improving the accurate transmission of the electric signal in the circuit, improving the stability of the circuit, and thus improving the display effect.

In some embodiments of the present disclosure, as shown in FIG. 18, some of the clock signal auxiliary lines each includes a first line segment, a meander structure and a second line segment; the first line segment and the second line segment are connected through the meander structure; the first line segment and the second line segment extend in the same direction.

For example, each of the clock signal auxiliary lines other than the first clock signal auxiliary line includes a meander structure.

The orthographic projection of the first line segment on the substrate overlaps with the orthographic projection of the clock signal line on the substrate. For each of the clock signal auxiliary lines, a sum of the length of the first line segment along the extension direction thereof. the length of the second line segment along the extension direction thereof and the length of the meander structure along the extension direction thereof is the same. Therefore, it is possible to compensate for the resistance difference due to the difference in length, thereby improving the accurate transmission of the electric signal in the circuit, improving the stability of the circuit, and further improving the display effect.

In some embodiments of the present disclosure, as shown in FIG. 18, some of the second signal lines (such as VDD1, VDD2, VSS1 and VSS2) are located between the first signal line groups and the shift register unit group, and the first gap X1 is located between the first signal line groups (the clock signal line CLK) and the second signal line (such as VDD1, VDD2, VSS1 and VSS2); the first gap X1 is twice over the minimum distance between two adjacent clock signal lines CLK in a direction pointing to the second signal line from the first signal line groups.

In addition, the array substrate further includes a second gap X2 located between the STV signal line and the shift register group. The width of the second gap X2 is smaller than the width of the first gap X1, where the width here refers to the dimension in the direction pointing to the second signal line from the first signal line groups.

An embodiment of the present disclosure provides a display panel including an array substrate as described above.

Herein, the structure of the array substrate included in the above-described display panel is not described in detail, and reference can be made to the foregoing description.

In an exemplary embodiment, the above display panel is a liquid crystal display (LCD), for example, the liquid crystal display panel may include a twisted nematic (TN) type, a vertical alignment (VA) type, an in plane switching (IPS) type, and an advanced super dimension switch (ADS) type.

In an exemplary embodiment, the above display panel may be an organic light emitting diode (OLED) display panel. The OLED display panel may have a Si substrate or a glass substrate.

In an exemplary embodiment, the display panel may be a Micro-Light Emitting Diode (Micro-LED). Alternatively, the display panel may be a Mini-Light Emitting Diode (Mini-LED). The Micro-LED display panel and the Mini-LED display panel also include a glass substrate or a silicon substrate.

An embodiment of the present disclosure provides a display device including a display panel as described above. The display device further includes a timing controller (TCON) configured to input different clock signals to respective clock signal lines of the display panel.

In an exemplary embodiment, the input of a clock signal (CLK signal) corresponding to GOA or Gate IC on the array substrate of the display device is output by a driver chip, such as a Level shifter or all-in-one PMIC chip. The timing sequence of the CLK signal corresponding to the output terminal (Pin) of the driving chip can be adjusted via codes, for example, the output terminal 1 (Pin1) which originally outputs the CLK1 signal can output the CLK5 signal after being adjusted via the codes, and the output terminal 5 (Pin5) which originally outputs the CLK5 signal can output the CLK1 signal after being adjusted via codes. In this way, by codes adjustment, the output signals of the driving chip may correspond to the distribution of the clock signal lines without changing the driving chip, so that the array substrate of the display device provided by the embodiments of the present disclosure can still be normally produced under original preparation conditions, that is to say, the array substrate of the display device provided by the embodiments of the present disclosure can still be produced using an original process in the case that the arrangement design of the clock signal lines are changed, thus minimizing the production cost.

The display device may be a display apparatus such as an LCD display, an OLED display, a Micro-LED display, a Mini-LED display, or any product or component having a display function and including the display apparatus, such as a television, a digital camera, a cell phone, a tablet computer, or the like.

The above description is only particular embodiments of the present disclosure, but the scope of protection of the present disclosure is not limited thereto, and changes or substitutions thereof will readily occur to a person skilled in the art within the scope of the present disclosure, and these are intended to be within the scope of protection of the present disclosure. Therefore, the scope of protection of the present disclosure should be determined by the scope of protection of the claims.

The invention claimed is:

1. An array substrate, comprising a display area and a peripheral area located at a side of the display area;

wherein the peripheral area comprises a plurality of first signal line groups, and each of the first signal line groups comprises two clock signal lines extending in a same direction;

wherein a phase of a clock signal transmitted by one of the clock signal lines in each of the first signal line groups is opposite to a phase of a clock signal transmitted by the other clock signal line in the same first signal line group, and the two clock signal lines in the same first signal line group are arranged to be adjacent to each other;

wherein the peripheral area further comprises at least one second signal line extending in the same direction as the clock signal line, and a signal transmitted in the second signal line is a constant voltage signal, the second signal line comprising at least one of a common signal line, a first power signal line, a second power signal line, a first level signal line, a second level signal line, and a ground line, and a minimum distance between the second signal line and the clock signal line being less than or equal to a preset value ranging from 1 μm to 5 cm;

wherein the peripheral area further comprises a plurality of shift register unit groups, and a number of shift register units comprised in each of the shift register unit groups is the same; the number of the shift register units in the same shift register unit group is the same as the number of the clock signal lines; each of the shift register units is located at a side of the first signal line groups closing to the display area;

when each of the shift register unit groups comprises N shift register units arranged in cascade, one clock signal line in one of the first signal line groups is electrically connected to a n-th stage shift register unit, and the other clock signal line in the same first signal line group is electrically connected to a (n−N/2)-th stage shift register unit, wherein n is less than or equal to N/2, n is odd and N is even;

wherein the array substrate comprises a substrate as well as a first conductive layer and a second conductive layer disposed on the substrate, wherein the second conductive layer is disposed on a side of the first conductive layer facing away from the substrate;

wherein the first conductive layer comprises the first signal line groups, and the second conductive layer comprises a plurality of clock signal auxiliary lines; an extension direction of at least a part of line segments of each of the clock signal auxiliary lines intersects with the first signal line groups; and wherein each of the clock signal lines comprises a plurality of first openings and a plurality of second openings, a number of the first openings is greater than a number of the second openings; orthographic projections of at least some of the clock signal auxiliary lines on the substrate overlap with a region delineated by orthographic projections of outer contours of the second openings on the substrate.

2. The array substrate according to claim 1, wherein the common signal line comprises a common electrode signal line, a common electrode feedback signal line, and a common electrode compensation signal line, and the common electrode signal line, the common electrode feedback signal line and the common electrode compensation signal line are electrically connected together.

3. The array substrate according to claim 1, wherein the second signal line is located on at least one of:

a side of each of the first signal line groups facing away from the display area; and a side of each of the first signal line groups closing to the display area.

4. The array substrate according to claim 1, wherein the peripheral area comprises M first signal line groups, wherein the first signal line group comprises an m-th clock signal line and a (m+M)-th clock signal line, wherein M comprises at least one of 5, 6, 8 or 10, m is less than or equal to M, and m is a positive integer;

the first signal line groups are respectively arranged in sequence along a first direction, wherein the first direction is a direction pointing to the display area from the peripheral area, or the first direction is a direction pointing to the peripheral area from the display area.

5. The array substrate according to claim 1, wherein the peripheral area comprises 3 first signal line groups, a first group among the first signal line groups comprises a first clock signal line and a fourth clock signal line, a second group among the first signal line groups comprises a second clock signal line and a fifth clock signal line, and a third group among the first signal line groups comprises a third clock signal line and a sixth clock signal line;

wherein the first group, the second group, and the third group among the first signal line groups are sequentially arranged in the first direction.

6. The array substrate according to claim 5, wherein the first clock signal line, the fourth clock signal line, the second clock signal line, the fifth clock signal line, the third clock signal line, and the sixth clock signal line are sequentially arranged in the first direction.

7. The array substrate according to claim 1, wherein the peripheral area comprises a first gap located between the shift register unit groups and the first signal line groups, and an extension direction of the first gap is the same as that of the clock signal lines;

wherein some of the clock signal auxiliary lines each comprises a meander structure, and an orthographic projection pattern on the substrate of the meander structure of each of the clock signal auxiliary lines is different in size, and the meander structure is located in the first gap.

8. The array substrate according to claim 7, wherein some of the clock signal auxiliary lines each comprises a first line segment, the meander structure and a second line segment, and the first line segment is connected to the second line segment through the meander structure;

wherein the orthographic projection of the first line segment on the substrate overlaps with the orthographic projection of the clock signal line on the substrate, for each of the clock signal auxiliary lines, a sum of a length of the first line segment along the extension direction of the first line segment, a length of the second line segment along the extension direction of the second line segment, and a length of the meander structure along the extension direction of the meander structure is the same.

9. The array substrate according to claim 7, wherein some of the second signal lines are disposed between the first signal line groups and the shift register unit groups, and the first gap is located between the first signal line groups and the second signal lines;

wherein a size of the first gap in a direction pointing to the second signal lines from the first signal line groups is twice over the minimum distance between two adjacent clock signal lines.

10. The array substrate according to claim 1, wherein signals transmitted in the clock signal lines are square wave signals.

11. A display panel comprising an array substrate, wherein the array substrate comprises a display area and a peripheral area located at a side of the display area;

wherein the peripheral area comprises a plurality of first signal line groups, and each of the first signal line groups comprises two clock signal lines extending in a same direction;

wherein a phase of a clock signal transmitted by one of the clock signal lines in each of the first signal line groups is opposite to a phase of a clock signal transmitted by the other clock signal line in the same first signal line group, and the two clock signal lines in the same first signal line group are arranged to be adjacent to each other;

wherein the peripheral area further comprises at least one second signal line extending in the same direction as the clock signal line, and a signal transmitted in the second signal line is a constant voltage signal, the second signal line comprising at least one of a common signal line, a first power signal line, a second power signal line, a first level signal line, a second level signal line, and a ground line, and a minimum distance between the second signal line and the clock signal line being less than or equal to a preset value ranging from 1 μm to 5 cm;

wherein the peripheral area further comprises a plurality of shift register unit groups, and a number of shift register units comprised in each of the shift register unit groups is the same; the number of the shift register units in the same shift register unit group is the same as the number of the clock signal lines; each of the shift register units is located at a side of the first signal line groups closing to the display area;

when each of the shift register unit groups comprises N shift register units arranged in cascade, one clock signal line in one of the first signal line groups is electrically connected to a n-th stage shift register unit, and the other clock signal line in the same first signal line group is electrically connected to a (n−N/2)-th stage shift register unit, wherein n is less than or equal to N/2, n is odd and N is even;

wherein the array substrate comprises a substrate as well as a first conductive layer and a second conductive layer disposed on the substrate, wherein the second conductive layer is disposed on a side of the first conductive layer facing away from the substrate;

wherein the first conductive layer comprises the first signal line groups, and the second conductive layer comprises a plurality of clock signal auxiliary lines; an extension direction of at least a part of line segments of each of the clock signal auxiliary lines intersects with the first signal line groups; and wherein each of the clock signal lines comprises a plurality of first openings and a plurality of second openings, a number of the first openings is greater than a number of the second openings; orthographic projections of at least some of the clock signal auxiliary lines on the substrate overlap with a region delineated by orthographic projections of outer contours of the second openings on the substrate.

12. A display device, comprising a display panel with an array substrate, wherein the array substrate comprises a display area and a peripheral area located at a side of the display area; wherein the peripheral area comprises a plurality of first signal line groups, and each of the first signal line groups comprises two clock signal lines extending in a same direction; wherein a phase of a clock signal transmitted by one of the clock signal lines in each of the first signal line groups is opposite to a phase of a clock signal transmitted by the other clock signal line in the same first signal line group, and the two clock signal lines in the same first signal line group are arranged to be adjacent to each other, wherein the display device further comprises a timing controller configured to input different clock signals to respective clock signal lines of the display panel;

wherein the peripheral area further comprises at least one second signal line extending in the same direction as the clock signal line, and a signal transmitted in the second signal line is a constant voltage signal, the second signal line comprising at least one of a common signal line, a first power signal line, a second power signal line, a first level signal line, a second level signal line, and a ground line, and a minimum distance between the second signal line and the clock signal line being less than or equal to a preset value ranging from 1 μm to 5 cm;

wherein the peripheral area further comprises a plurality of shift register unit groups, and a number of shift register units comprised in each of the shift register unit groups is the same; the number of the shift register units in the same shift register unit group is the same as the number of the clock signal lines; each of the shift register units is located at a side of the first signal line groups closing to the display area;

when each of the shift register unit groups comprises N shift register units arranged in cascade, one clock signal line in one of the first signal line groups is electrically connected to a n-th stage shift register unit, and the other clock signal line in the same first signal line group is electrically connected to a (n−N/2)-th stage shift register unit, wherein n is less than or equal to N/2, n is odd and N is even;

wherein the array substrate comprises a substrate as well as a first conductive layer and a second conductive layer disposed on the substrate, wherein the second conductive layer is disposed on a side of the first conductive layer facing away from the substrate;

wherein the first conductive layer comprises the first signal line groups, and the second conductive layer comprises a plurality of clock signal auxiliary lines; an extension direction of at least a part of line segments of each of the clock signal auxiliary lines intersects with the first signal line groups; and wherein each of the clock signal lines comprises a plurality of first openings and a plurality of second openings, a number of the first openings is greater than a number of the second openings; orthographic projections of at least some of the clock signal auxiliary lines on the substrate overlap with a region delineated by orthographic projections of outer contours of the second openings on the substrate.

* * * * *